E. W. TOWNSLEY.
LAMP CHIMNEY.
APPLICATION FILED APR. 1, 1918.

1,278,061.

Patented Sept. 3, 1918.

WITNESSES
R. W. Hoagland
J. P. Hollingsworth

INVENTOR
Emma W. Townsley,
BY Richard Bowen.
ATTORNEY

UNITED STATES PATENT OFFICE.

EMMA W. TOWNSLEY, OF LOCKPORT, NEW YORK, ASSIGNOR OF ONE-THIRD TO FRANK TROZZO, OF LOCKPORT, NEW YORK.

LAMP-CHIMNEY.

1,278,061.      Specification of Letters Patent.      Patented Sept. 3, 1918.

Application filed April 1, 1918. Serial No. 226,023.

*To all whom it may concern:*

Be it known that I, Mrs. EMMA W. TOWNSLEY, a citizen of the United States, residing at Lockport, in the county of Niagara and State of New York, have invented certain new and useful Improvements in Lamp-Chimneys, of which the following is a specification.

This invention relates generally to an improvement in lamps and particularly to the globe or chimney used to protect the flame of the lamp; the invention having for its object to provide a novel lamp chimney of glass which will improve the illuminating properties of the burner, provide a relatively large heat radiating surface to warm the room containing the lamp, and form a steady support for cooking utensils, thus enabling the lamp to serve the purpose of a portable cook stove.

Figure 1:
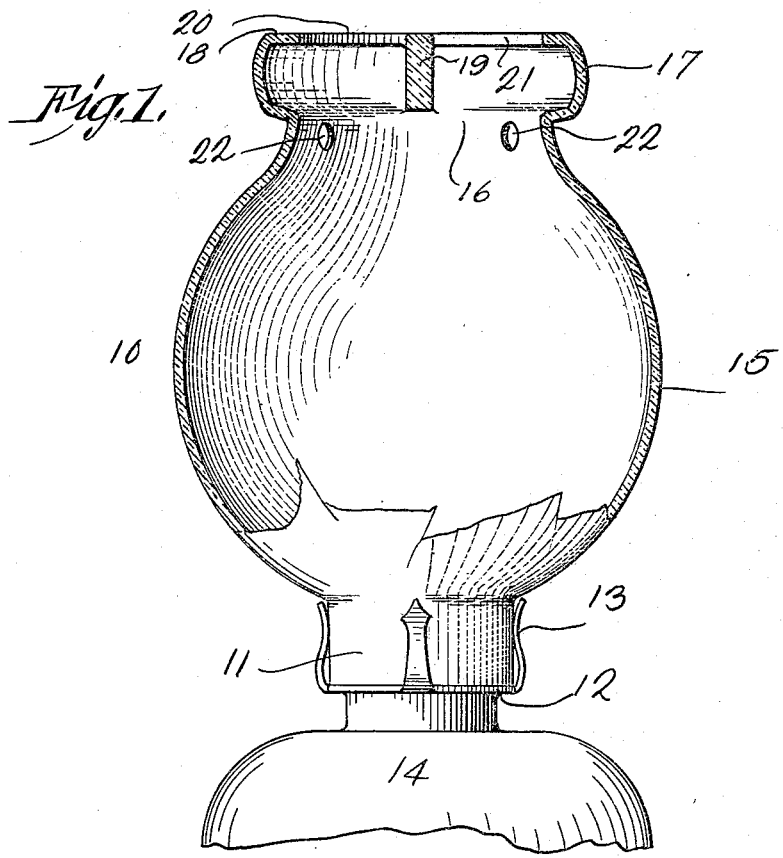

With the above objects in view, the invention consists in the novel construction, combination and arrangement of parts, hereinafter described, pointed out in the appended claims and illustrated in the accompanying drawings, in which, Figure 1 is a vertical, central sectional view through the upper portion of the improved lamp chimney, the lower portion of the chimney and a part of the lamp to which it is attached being shown in elevation.

Figure 2:
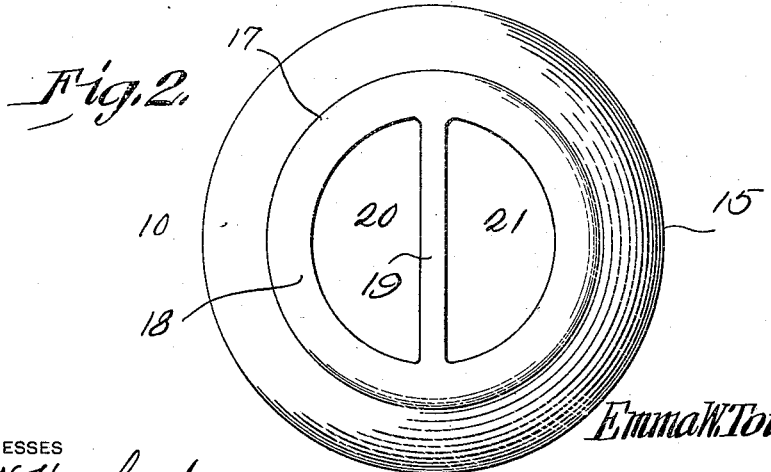

Fig. 2 is a top plan view of the lamp chimney.

In the drawings, 10 indicates the lamp chimney as a whole made of glass provided as usual with a neck 11 adapted to be supported on a horizontal annular gallery 12 forming a part of the lamp burner and maintained in place thereon by upwardly extending spring fingers 13, the gallery and spring fingers forming a part of the lamp 14 and are common to lamps now in use.

Above the neck 11 the chimney 10 swells outwardly as usual in a more or less spherical form 15 which may be a true sphere or more or less elongated vertically as conditions call for, the chimney having an outlet or open upper end 16 through which air and the products of combustion pass from the chimney.

The upper end 16 of the chimney has formed integrally therewith a support for cooking utensils consisting of a circular enlargement 17 continuous with the side walls of the chimney and of greater diameter than the outlet, the top of the extension which forms a rest for vessels being formed by an annular horizontal flange 18 projecting inwardly from the upper edge of the extension or support 17. The walls of the chimney 10 and the utensil support 17 are made much thicker than the usual lamp chimney or shade for the purpose of insuring a strong support for utensils placed upon the chimney to be heated and lessen the danger of breakage. Additional strengthening means are provided in the form of a dividing wall 19, extending diametrically across the utensil support 17 downwardly from the top surface or flange 18 thereof to the top 16 of the chimney, this wall serving to divide the outlet of the chimney into two openings 20 and 21 over which two vessels may be placed and their contents cooked at the same time.

To insure perfect ventilation while cooking which, as is evident, will cause the partial or complete closure of the top of the chimney, there is provided a plurality of holes 22 in the top 16 of the chimney just below the support 17 through which heated air and the products of combustion may freely escape and so maintain perfect combustion at the burner.

A lamp chimney constructed as described will be found very convenient for lighting, heating and cooking in emergencies in rural sections of the country where gas and electricity are not obtainable, in the city, in camps and in other places that will suggest themselves to the user. Preferably, the lamps are of large size, the reservoir being designed to hold about a gallon of oil and fitted with a burner and chimney of proportionate size. A brilliant light will thus be furnished and sufficient heat generated for light cooking, also for raising the temperature of the room in cold weather to a comfortable degree. By making the chimney with thick walls and of tough glass, the chimney will support without danger of breaking, two utensils at the same time and will, furthermore, withstand rough usage.

Having described my invention, I claim:

1. A lamp chimney made of glass having an integral enlargement on its upper end extending laterally beyond the top of the chimney and a plurality of perforations in the walls of the chimney at its top, an inwardly projecting horizontal flange at the top of said enlargement, and a diametrical supporting wall extending across the enlargement.

2. A lamp chimney made of glass having an enlargement on its upper end and a plurality of ventilating perforations in the top of the chimney immediately below said enlargement, an annular horizontal flange projecting inwardly from the top edge of the enlargement to form a support for heating vessels, and a supporting wall extending diametrically across the enlargement.

In testimony whereof I affix my signature in presence of two witnesses:

MRS. EMMA W. TOWNSLEY.

Witnesses:
LEO L. KELSET,
WM. M. FRITTON.